US009348774B2

(12) United States Patent
Baryudin et al.

(10) Patent No.: US 9,348,774 B2
(45) Date of Patent: May 24, 2016

(54) CONTROLLER-OPAQUE COMMUNICATION WITH NON-VOLATILE MEMORY DEVICES

(71) Applicant: LSI Corporation, San Jose, CA (US)

(72) Inventors: Leonid Baryudin, San Jose, CA (US); Earl T. Cohen, Oakland, CA (US); Gordon James Coleman, Sunnyvale, CA (US)

(73) Assignee: Seagate Technology LLC, Cupertino, CA (US)

( * ) Notice: Subject to any disclaimer, the term of this patent is extended or adjusted under 35 U.S.C. 154(b) by 483 days.

(21) Appl. No.: 13/750,200

(22) Filed: Jan. 25, 2013

(65) Prior Publication Data

US 2014/0215123 A1  Jul. 31, 2014

(51) Int. Cl.
*G06F 12/02* (2006.01)
*G06F 13/16* (2006.01)
*G06F 13/42* (2006.01)

(52) U.S. Cl.
CPC ............ *G06F 13/16* (2013.01); *G06F 13/4239* (2013.01); *G06F 12/0246* (2013.01)

(58) Field of Classification Search
CPC .. G06F 12/0246; G06F 13/16; G06F 13/4239
See application file for complete search history.

(56) References Cited

U.S. PATENT DOCUMENTS

| 7,167,929 | B2 | 1/2007 | Steinmetz et al. |
| 8,219,882 | B2 | 7/2012 | Tamura et al. |
| 2003/0131185 | A1* | 7/2003 | Dover ........................... 711/103 |
| 2005/0097236 | A1* | 5/2005 | Delaney et al. ................. 710/15 |
| 2012/0173792 | A1 | 7/2012 | Lassa et al. |
| 2013/0124932 | A1 | 5/2013 | Schuh et al. |

* cited by examiner

*Primary Examiner* — Kevin Verbrugge
*Assistant Examiner* — Rocio Del Mar Perez-Velez
(74) *Attorney, Agent, or Firm* — Suiter Swantz pc llo

(57) ABSTRACT

The disclosure is directed to a system and method for controlling a non-volatile memory (NVM) device with controller-opaque commands issued by a host. A device controller is configured to receive a command script from a host. The device controller executes one or more commands of the command script including sending one or more operations of the command script to a NVM device in communication with the device controller. The device controller is enabled to provide at least a portion of the one or more operations from the command script to be executed by the NVM device without any embedded knowledge by the device controller of the actions of and/or consequences of the operations, thereby allowing the host to access NVM commands that are not necessarily supported by the device controller.

20 Claims, 3 Drawing Sheets

US 9,348,774 B2

CONTROLLER-OPAQUE COMMUNICATION WITH NON-VOLATILE MEMORY DEVICES

FIELD OF INVENTION

The disclosure relates to the field of non-volatile memory devices and communication with non-volatile memory devices.

BACKGROUND

In various embodiments, device controllers, such as solid-state disk (SSD) controllers enable a host to access a non-volatile memory (NVM) device, such as a SSD or flash device. The host is typically enabled to access a subset of NVM commands, such as standard input/output (IO) and control operations, that are supported by the device controller. However, the host is often unable to access certain commands, such as those allowing tuning of the NVM device and adjustment of timing parameters, without specific modification of the device controller to support said commands.

SUMMARY

An embodiment of the disclosure includes a system for controlling a NVM device with controller-opaque commands issued by a host. The system includes a device controller configured to receive a script, containing commands to be executed (command script), from a host. In some embodiments, the device controller is further configured to store the script in a selected log page of a plurality of log pages. The device controller executes one or more commands of the script including sending one or more operations of the script to a NVM device. The NVM device is configured to receive one or more operations of the script from the device controller and execute the one or more operations. The device controller is enabled to provide at least a portion of the one or more operations from the script to be executed by the NVM device without any embedded knowledge by the device controller of the actions of and/or consequences of the operations, thereby allowing the host to access NVM commands that are not necessarily supported by the device controller. In many embodiments this functionality will be used for test/debug purposes. Accordingly, the command script is sometimes referred to as a "test script". Neither term is intended to limit the disclosure in any way.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Patent application Ser. No. 13/436,639, hereby incorporated by reference, describes solid-state disk (SSD) manufacturing self-test (MST) capability enabling predefined tests to be prepared and run on production instances of an SSD to gather results. In some embodiments, the tests are created without any specific knowledge of internal operation of the SSD, such as how elements of the test are implemented by the SSD. In some embodiments, the tests are customized in accordance with selected production or quality assurance requirements.

The tests are defined and prepared by generating an MST test script that is loaded onto one or more production SSDs by a host. The SSDs are enabled to run (i.e. self-execute) the test scripts upon power up or upon receiving special command from the host. In some embodiments, the power up and self-execution of the test script occur while the SSD is coupled to one or more of the following: the host that loaded the test script, a rack enabled to provide power, and any other component enabled to power the SSD. In some embodiments, an SSD controller provides the host with access to a limited subset of SSD commands that are supported by the SSD controller (i.e. executable by the SSD controller). The host is sometimes limited to high level MST commands, such as WRITE, ERASE, or PHY BURN IN, which require the SSD manufacturer to define upfront what low level operations to use in association with the MST commands, thus limiting scope of the test.

In various embodiments, described herein, flexible and/or unobstructed access to a SSD or any other non-volatile memory (NVM) device enables a host to perform arbitrary command sequences on an NVM device. In some embodiments, direct read/write data access (sometimes using vendor-specific commands) enables the host to perform low-level debug and testing, such as low-level debug and testing of attached flash devices. In some embodiments, the host is enabled to exercise or test NVM components without modifying SSD firmware. Access capability without SSD firmware modification allows for significant savings in development and testing time. A further advantage is that NVM media vendors are not required to share proprietary manufacturing tests with SSD vendors and/or the vendors of SSD controllers because such testing is enabled without SSD controller firmware modification.

Figure 1:
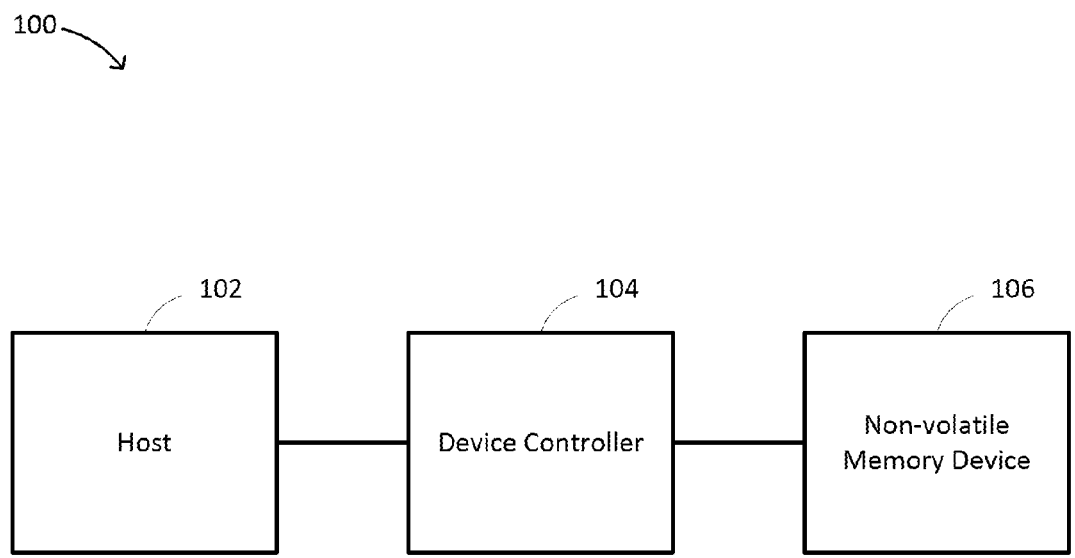
FIG. 1 is a block diagram illustrating a system for controlling a non-volatile memory device, in accordance with an embodiment of the disclosure.
Figure 2:
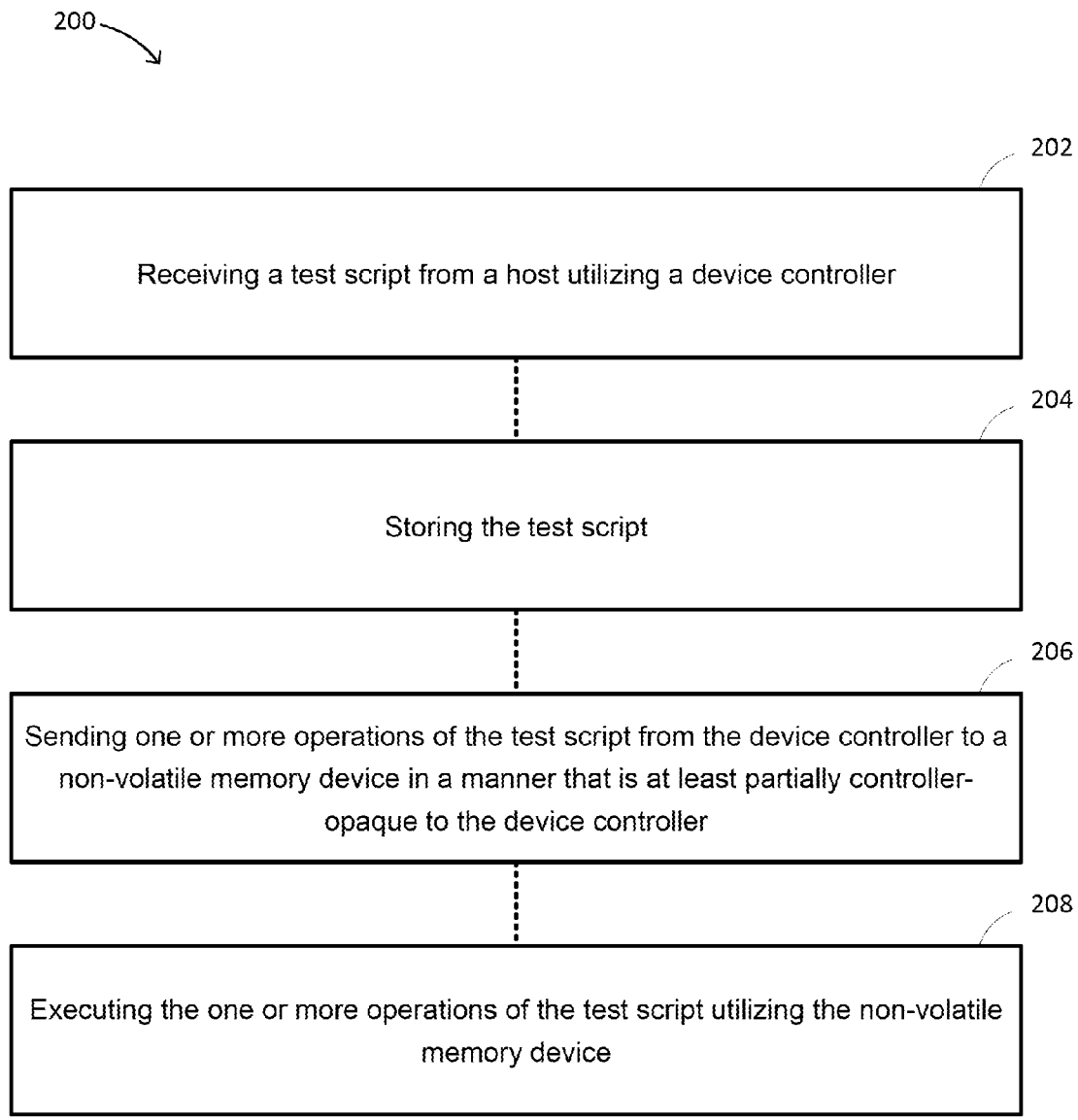
FIG. 2 is a flow diagram illustrating a method of controlling a non-volatile memory device, in accordance with an embodiment of the disclosure.
Figure 3:
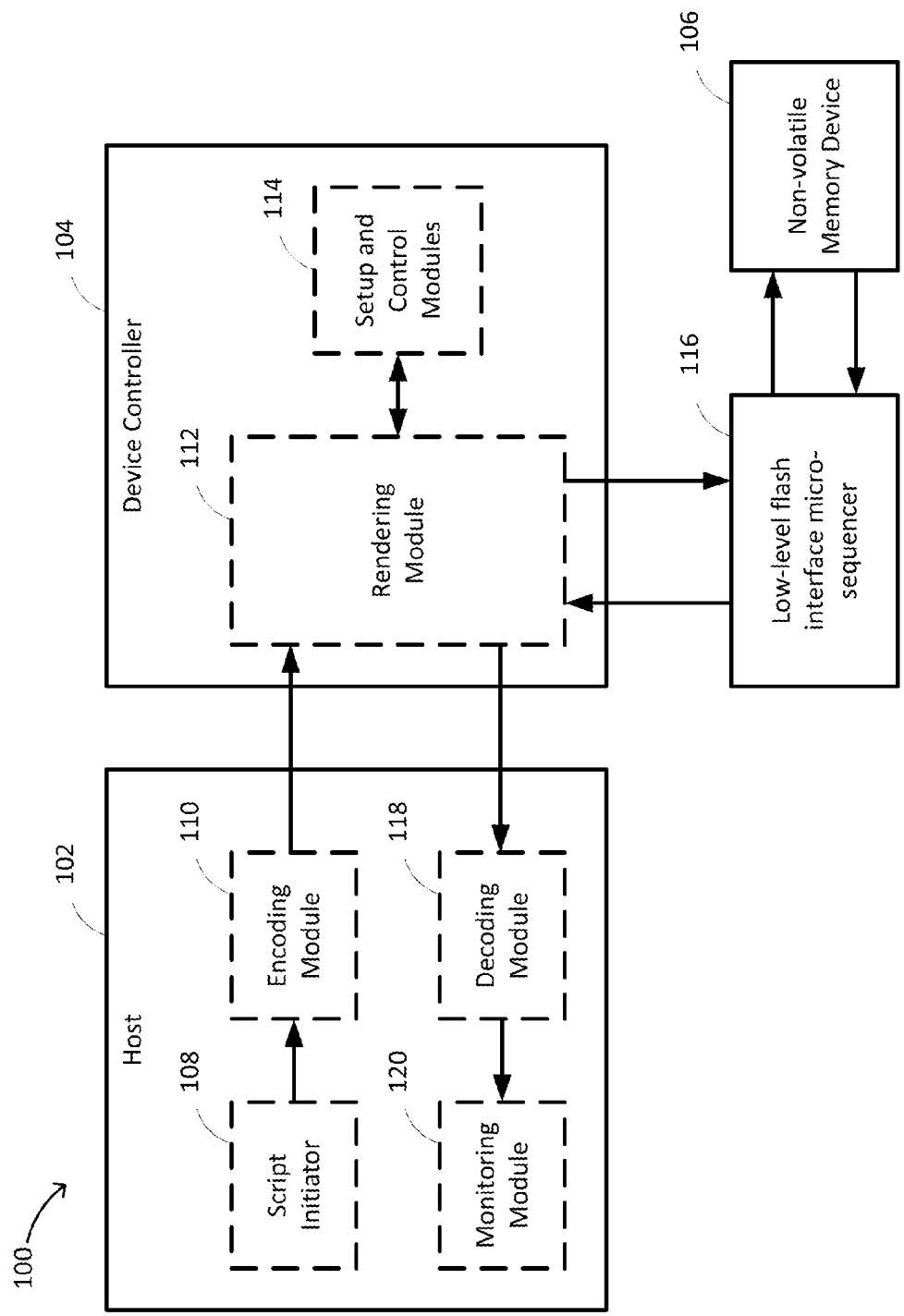
FIG. 3 is a block diagram illustrating optional components of the system for controlling the non-volatile memory device, in accordance with various embodiments of the disclosure.

FIGS. 1 through 3 illustrate embodiments of a system 100 and method 200 for controlling a NVM device 106, such as a SSD, with controller-opaque commands issued by a host 102, such as a computing system including one or more single-core or multiple-core processors configured to execute program instructions from at least one carrier medium. As used herein, the term "controller-opaque" refers to the ability of NVM operations or commands to be received from the host 102 by a device controller 104, such as an SSD controller, and transmitted to the NVM device 106 without the device controller 104 having any embedded knowledge, such as in device controller firmware, of the actions of and/or consequences of the commands (i.e. what the commands will do to the NVM device 106). For example, a first command is passed through the device controller 104 to the NVM device 106 to cause the NVM device 106 to prepare status information, a second command is passed through the device controller 104 to retrieve the prepared status information from the NVM device 106, and a third command is executed by the device controller 104 to return the retrieved status information, all without the device controller permanently retaining any information regarding any of the commands or the status information. In some embodiments, the system 100 enables the host 102 to perform arbitrary command sequences on NVM media for manufacturing, debug, or test purposes.

The terms "transparent NVM access (TNA)" or "transparent flash access (TFA)" (i.e. when the NVM device 106 is a flash device) are sometimes used to describe the controller-opaque relationship. As further discussed herein, a virtual tunnel effectively links the host 102 and the NVM device 106 through the device controller 104. Thus, the device controller 104 is rendered somewhat "transparent" as the host 102 is enabled to access the NVM device 106 without substantial interference by the device controller 104. In some embodiments, the TNA or TFA functionality exposes the NVM device 106 low level operations to the host 102 enabling one or more of (but not limited to) the following: configuring NVM device interface (e.g. setting clocks), wiggling NVM device interface pins with arbitrary sequence and timing (given clocking constraints of the NVM interface), sending arbitrary bytes as parameters of one or more NVM sequences, reading status or result bytes of one or more NVM sequences, and moving data to or from the NVM device 106.

FIG. 2 illustrates an embodiment of a method 200 of controlling a NVM device 106 with controller-opaque commands issued by a host 102. According to various embodiments, method 200 is manifested by system 100 (as illustrated in FIG. 1 or FIG. 3). As such, any steps or functions described with regard to embodiments of system 100 or method 200 are applicable to both of system 100 and method 200, unless otherwise noted.

At step 202, the device controller 104 is configured to receive a test script, such as an MST script, from the host 102. The test script includes one or more commands to be executed by the device controller 104 and one or more operations executable by the NVM device 106. In some embodiments, the host 102 is configured to encode at least a portion of the test script including the one or more NVM operations to enable the device controller 104 to process (e.g. receive, store, send) the encoded NVM operations in a manner that is controller-opaque.

At step 204, the device controller 104 is configured to store the test script in a selected log page of a plurality of log pages. In some embodiments, the device controller 104 is further configured to store the test script or at least one or more NVM operations of the test script for a selected period of time before sending the one or more NVM operations to the NVM device 106. In some embodiments, the one or more NVM operations are stored for a predefined (e.g. programmed) interval of time or until a user or system request is made to send the one or more NVM operations to the NVM device 106 for execution.

At step 206, the device controller 104 is configured to execute one or more commands of the test script. In some embodiments, the one or more commands executed by the device controller 104 include sending the one or more NVM operations of the test script to the NVM device 106. In some embodiments, at least a portion of the one or more NVM operations are provided by the device controller 104 to the NVM device 106 in a manner that is controller-opaque. In some embodiments, the one or more commands executed by the device controller 104 include generating of additional data by the device controller 104 itself, such as data to be written onto NVM media and/or additional operations, and sending the data and operations to the NVM device 106.

At step 208, the NVM device 106 is configured to execute the one or more operations. In some embodiments, the NVM device 106 generates data including results associated with the one or more operations executed by the NVM device 106. In some embodiments, the results include one or more of: statuses and data read from the NVM media. In some embodiments, the device controller 104 is further configured to receive data from the NVM device 106 in response to execution of the one or more NVM operations and to transmit the data to the host 102. In some embodiments, the host 102 is further configured to decode the data associated with the one or more operations executed by the NVM device 106 to extract the results.

In some embodiments, TNA communication between the host 102 and the NVM controller 106 through the device controller 104 is accomplished via at least two types of commands including TNA request and TNA response commands. A TNA request includes TNA primitives containing one or more operations to be executed and/or stored. In some embodiments a TNA request further includes optional TNA primitives containing data to be written onto NVM device. A TNA response includes TNA primitives (i.e. data associated with execution of the one or more operations) including various results such as, but not limited to, NVM device status and error codes as well as data read from NVM device. In some embodiments, TNA requests are always paired up with TNA responses.

In some embodiments, TNA communications are transmitted or received among the various components of system 100 utilizing self-monitoring, analysis, and reporting technology (SMART) command transport (SCT). According to such embodiments, a TNA request includes a SCT command including one or more NVM operations (and one or more optional SCT write commands) sent to a plurality of SMART logs configured to deliver TNA script instructions (and optional write data). According to such embodiments, a TNA response includes one SCT command including data associated with execution of the one or more NVM operations (and one or more optional SCT read commands) from a plurality of SMART logs configured to deliver resulting statuses (and optional read data).

In some embodiments, the host 102 is configured to provide commands, such as TNA communications, encoded in TNA language to enable processing by the device controller 104. In some embodiments, TNA language includes a set of commands (referred to as "TNA primitives") which instruct the device controller to process at least a portion of a TNA script including one or more NVM operations that are controller-opaque to the device controller 104.

In some embodiments, the TNA language includes low-level flash interface (LFI) micro-sequence encoding. According to various embodiments, the LFI micro-sequence encoding is one or more of: enabled to describe pin states and timing diagrams of the NVM device 106, enabled to encode sequences representing related transitions of data and control pins of the device controller 104 to implement a protocol that communicates to and/or from the NVM device 106, enabled to send control information to the NVM device 106 according to a protocol of the NVM device 106, enabled to send data to the NVM device 106 according to a protocol of the NVM device 106, enabled to receive status and/or data from the NVM device 106 according to a protocol of the NVM device 106; and enabled to perform other communications and/or signaling to operate the NVM device 106.

In some embodiments, the LFI micro-sequence encoding includes one or more of the following commands: WIG—controls the outputs to the flash interface; ZOL (zero overhead loop)—a set of sequence commands to be repeated a specified number of times; CEN—control the CEN outputs; WTCK—waits for a phase on a clock generator before proceeding; MODE—sets operating mode output bits; WAIT—waits for the expiration of a count, or a condition; and BUB—sets a WIG type operation that is to occur in an execution bubble.

In some embodiments, illustrated in FIG. 3, the host 102 includes a script initiator 108 configured to provide a test script to an encoding module 110. The encoding module 110 is configured to process the test script to generate an encoded script including one or more commands executable by the device controller 104 and enabling the device controller 104 to transmit one or more NVM operations of the script to the NVM device 106 without any embedded knowledge by the device controller 104 of the actions of and/or consequences of the operations. Accordingly, the host 102 is enabled to transmit the one or more NVM operations via the encoded script through the device controller 104 to the NVM device 106 regardless of whether the device controller 104 is specifically configured to support the NVM operations. In some embodiments, the encoding module 110 is configured to generate binary encoded commands for simpler processing by the device controller. In some embodiments, the encoding module 110 includes an LFI micro-sequence mnemonics converter configured to convert at least a portion of the script encoded as LFI micro-sequences into LFI micro-sequencer instructions. In some embodiments, the LFI micro-sequencer instructions are 32-bits wide. In some embodiments, the controller-opaque transmission enables low level control of the NVM device 106 by the host 102, such as control of pin states and timing parameters.

In some embodiments, the encoding module 110 is configured to encode the test script utilizing a Type/Length/Value (TLV) encoding scheme to encode TNA primitives, thereby facilitating script processing by the device controller 104. In some embodiments, Type is 1 byte long, Length is 1 or 2 bytes long (depending on Type), and Value is Length bytes long (absent if Length=0). In some embodiments, the test scripts for selected NVM operations are developer-created. In some embodiments, the system 100 further includes a library supporting proprietary sequences such as, but not limited to, VT read, stress modes, read/write of trim data.

In some embodiments, the device controller 104 is configured to parse the encoded script and execute one or more commands of the script. In some embodiments, the device controller 104 includes a rendering module 112 configured to parse the encoded test script and execute the one or more commands. In some embodiments, the one or more commands include TNA primitives encoded in a TNA request. In some embodiments, the TNA primitives include instructions enabling the rendering module to send one or more encoded NVM operations to the NVM device 106.

In some embodiments, the device controller 104 includes one or more setup and/or control modules 114 in communication with the rendering module 112. In some embodiments, the setup/control modules 114 are configured to provide device controller setup and control operations, such as configuration of read/write registers and configuration of any other hardware registers.

In some embodiments, the NVM device 106 is in communication with an LFI micro-sequencer 116. In some embodiments, the LFI micro-sequencer 116 is contained in or coupled to one of the device controller 104 or the NVM device 106. In some embodiments, the LFI micro-sequencer 116 is configured to receive one or more LFI micro-sequencer instructions of the encoded NVM operations from the device controller 104. In some embodiments, the LFI micro-sequencer 116 is configured to provide program sequences (according to the LFI instructions) executable by the NVM device 106. Accordingly, the NVM device 106 is enabled to execute the one or more encoded NVM operations of the test script. In some embodiments, the program sequences include low-level timing sequences, such as clock cycle-by-clock cycle sequences, associated with the selected NVM operations.

In some embodiments, the rendering module 112 is further configured to format data associated with the executed NVM operations into a TNA response. In some embodiments, the formatting includes filling the TNA response with resulting statuses and optional read data encoded in a form executable by the host 102. In some embodiments, the host 102 includes a decoding module 118 configured to decode the TNA response to extract the results of the NVM operations executed by the NVM device 106. In some embodiments, the decoding module 118 is configured to decode TNA primitives of the TNA response and execute one or more associated instructions. In some embodiments, the TNA primitives include instructions enabling the decoding module 118 to extract the results (e.g. statuses, read data).

In some embodiments, the TNA primitives include further instructions enabling the decoding module 118 or any other portion of the host 102 to process the results. In some embodiments, the decoding module 118 is further configured send the results to a monitoring module 120 configured to process the results. In some embodiments, the processing includes one or more of: dumping statuses/data, saving statuses/data to a file, and transferring statuses/data to a selected location or device.

In some embodiments, as previously discussed, the TNA primitives include directive instructions and/or parameters for the device controller 104 to execute. In some embodiments, the TNA primitives are compound primitives including one or more additional TNA primitives as parameters. In some embodiments, the TNA primitives include "LFI primitives" carrying instructions enabling the device controller 104 to perform a specified action with the LFI micro-sequencer 116, such as sending LFI micro-sequences (of the encoded test script) to the LFI micro-sequencer 116 or reading results of executed NVM operations.

In some embodiments, additional primitives (i.e. "glue logic") are used to configure the device controller for TNA communications and data transfers. In some embodiments, additional primitives include one or more of: HSTAT—hardware status primitives used to read and write to certain registers of the device controller, RESULT—primitives used in TNA responses to describe statuses delivered to the host 102, DATA—primitives used to specify data source and destination as well as instruct the device controller 104 when data should be transferred, CTRL—primitives used to control execution flow, and GRP—primitives used to group other primitives together in order to facilitate execution.

In some embodiments, the test script includes a TNA language encoded script in an ASCII file that is parsed and encoded by the encoding module 110. In some embodiments, the test script includes comments and TNA primitives. In some embodiments, text following a double slash "//" or pound sign "#" until the end of a line is considered a comment and ignored (i.e. not executed). In some embodiments, lines beginning with a dash "-" are ignored. In some embodiments, spaces, tabulations, and/or carriage returns are ignored. In some embodiments, commas outside parameter specifications are ignored.

In some embodiments, TNA primitives are characterized by mnemonics accordingly to the following format: PRIM ([param1 [, param2 [ . . . ]]]). In some embodiments, primitive parameters include one or more of the following: a number with any of bases 2, 8, 10, or 16, a quoted ASCII string, and another primitive (i.e. for compound primitives).

In some embodiments, the test script includes a standard scripting language, such as Perl or Python, where function calls represent TNA primitives. In some embodiments, the encoding module 118 includes an external library configured to implement the functions corresponding to respective TNA primitives. In some embodiments, a standard language interpreter (e.g. Python) is configured to process the test script to render a TLV format encoded byte string executable by the device controller 104.

In some embodiments, the host 102 is configured to send test scripts to be immediately executed by the NVM device 106 for interactive debugging (referred to as "TNA Execute Mode"). In some embodiments, the host 102 is configured to send test scripts to be stored by the device controller 104 for later execution at a selected time. In some embodiments, test scripts to be stored for later execution are referred to as "TNA applets" and the execution is determined by device controller firmware. In some embodiments, each TNA applet is associated with a respective applet identification enabling the device controller 104 to schedule storing and execution of a TNA applet according its applet identification.

In some embodiments, TNA applets include MST scripts to enable self-execution by the NVM device 106 at a selected time. In some embodiments, MST firmware is enabled to use selected proprietary NVM commands encoded in the form of a TNA applet for specified operations. In some embodiments, the device controller 104 is configured to discriminately recognize selected applet identifications and to execute the associated test scripts in run time.

It should be recognized that in some embodiments the various functions or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

Embodiments manifesting methods described herein may include storing results in a storage medium. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for controlling a non-volatile memory device, comprising:
   a device controller; and
   a non-volatile memory device in communication with the device controller, wherein the non-volatile memory device is or includes a flash device;
   wherein the device controller is configured to:
      receive a command script from a host, the command script including one or more commands to be executed by the device controller and one or more operations to be executed by the non-volatile memory device, the one or more operations being encoded by the host as low-level flash interface micro-sequences to enable the device controller to process the one or more operations in a controller-opaque manner;
      execute the one or more commands of the command script; and
      send the one or more operations of the command script to the non-volatile memory device in a controller-opaque manner in response to execution of the one or more commands;
   wherein the non-volatile memory device is configured to:
      receive the one or more operations of the command script from the device controller;
      execute the one or more operations of the command script; and
      in response to execution of the one or more operations of the command script, send data associated with the execution of the one or more operations to the device controller for transmission to the host.

2. The system of claim 1, further comprising the host, wherein the host is configured to encode the one or more operations of the command script as the low-level flash interface micro-sequences.

3. The system of claim 1, wherein the non-volatile memory device is the flash device.

4. The system of claim 1, further comprising the host, wherein the host is configured to receive, via the device controller, the data associated with the execution of the one or more operations from the non-volatile memory device, wherein the host is configured to decode the data associated with the execution of the one or more operations by the non-volatile memory device to extract at least one of a status of the non-volatile memory device and at least one error code.

5. The system of claim 1, wherein the device controller is further configured to store the one or more operations of the command script for a selected period of time before sending the one or more operations to the non-volatile memory device.

6. The system of claim 1, wherein the command script is a test script.

7. The system of claim 6, wherein the non-volatile memory device is a solid-state disk.

8. The system of claim 6, wherein the test script is configured to test non-volatile memory device components without modifying firmware of the non-volatile memory device.

9. The system of claim 1, wherein the command script is or includes a transparent non-volatile memory access request and the data associated with the execution of the one or more operations is or is included within a transparent non-volatile memory access response.

10. The system of claim 1, wherein the device controller is further configured to store the command script in a selected log page of a plurality of log pages.

11. A method of controlling a non-volatile memory device, comprising:
    receiving, by a device controller, a command script from a host, the command script including one or more commands to be executed by the device controller and one or more operations to be executed by a non-volatile memory device, the one or more operations being encoded by the host as low-level flash interface micro-sequences to enable the device controller to process the one or more operations;
    executing, by the device controller, the one or more commands of the command script;
    sending, by the device controller, the one or more operations of the command script to the non-volatile memory device in response to execution of the one or more commands;
    receiving, by the non-volatile memory device, the one or more operations of the command script from the device controller, wherein the non-volatile memory device is or includes a flash device;
    executing, by the non-volatile memory device, the one or more operations of the command script; and
    in response to execution of the one or more operations of the command script, sending, by the non-volatile memory device, data associated with the execution of the one or more operations to the device controller for transmission to the host.

12. The method of claim 11, wherein the non-volatile memory device is the flash device.

13. The method of claim 11, further comprising:
    sending, by the device controller, the data associated with the execution of the one or more operations by the non-volatile memory device to the host; and
    decoding, by the host, the data associated with the execution of the one or more operations by the non-volatile memory device to extract at least one of a status of the non-volatile memory device and at least one error code.

14. The method of claim 11, wherein the executing, by the device controller, the one or more commands of the command script causes the device controller to perform:
    generate data associated with execution of at least one of the one or more commands of the command script; and
    send the data associated with the execution of the at least one of the one or more commands of the command script to the non-volatile memory device.

15. The method of claim 11, further comprising:
    storing, by the device controller, the one or more operations of the command script for a selected period of time before sending the one or more operations to the non-volatile memory device.

16. A system for controlling a non-volatile memory device, comprising:
    a host including an encoding module, the encoding module including a converter, the encoding module configured to encode at least a portion of a command script at least by converting at least a portion of the command script into low-level flash interface micro-sequencer instructions;
    a device controller in communication with the host, the device controller configured to process at least a portion of the command script and send at least the low-level flash interface micro-sequencer instructions to a low-level flash interface micro-sequencer;
    the low-level flash interface micro-sequencer configured to receive the low-level flash interface micro-sequencer instructions from the device controller and, in response to receipt of the low-level flash interface micro-sequencer instructions, send one or more operations to a flash device; and
    the flash device in communication with the low-level flash interface micro-sequencer, the flash device configured to receive the one or more operations from the low-level flash interface micro-sequencer and execute the one or more operations.

17. The system of claim 16, wherein the host is configured to encode the one or more operations of the command script to enable the device controller to process at least a portion of the one or more operations.

18. The system of claim 16, wherein at least one of the device controller and the flash device includes the low-level flash interface micro-sequencer.

19. The system of claim 16, in response to execution of the one or more operations of the command script, the flash device is configured to send data associated with the execution of the one or more operations to the device controller for transmission to the host, wherein the host is further configured to receive the data associated with the execution of the one or more operations and decode the data associated with the execution of the one or more operations to extract at least one of a status of the flash device and at least one error code.

20. The system of claim 16, wherein the device controller is further configured to store the command script for a selected period of time before sending the low-level flash interface micro-sequencer instructions to the low-level flash interface micro-sequencer.

* * * * *